great inventor

United States Patent [19]

Wise

[11] Patent Number: 5,643,415
[45] Date of Patent: Jul. 1, 1997

[54] PRECIPITATED CALCIUM CARBONATE PARTICLES FROM BASIC CALCIUM CARBONATE

[76] Inventor: Kenneth J. Wise, 235 E. 42nd St., New York, N.Y. 10017

[21] Appl. No.: 487,766

[22] Filed: Jun. 8, 1995

Related U.S. Application Data

[62] Division of Ser. No. 709,951, Jun. 4, 1991.

[51] Int. Cl.[6] .................................................. D21H 17/67
[52] U.S. Cl. .................................................. 162/181.2
[58] Field of Search .................................. 423/432, 436, 423/419.1, 265, 266; 106/463, 464; 252/181.2; 162/181.2, 135

[56] References Cited

U.S. PATENT DOCUMENTS

| | | | |
|---|---|---|---|
| 4,181,567 | 1/1980 | Riddell et al. | 162/168 NA |
| 4,714,603 | 12/1987 | Vanderheiden | 423/432 |
| 5,043,017 | 8/1991 | Passaretti | 106/465 |
| 5,215,734 | 6/1993 | Kunesh et al. | 423/430 |
| 5,458,679 | 10/1995 | Fairchild | 106/465 |

*Primary Examiner*—Janet C. Baxter
*Assistant Examiner*—Amy M. Harding
*Attorney, Agent, or Firm*—Michael J. Pantuliano; Marvin J. Powell

[57] ABSTRACT

Novel precipitated calcium carbonate particles of varying size and shape, are prepared by adding gaseous carbon dioxide to an aqueous slurry containing basic calcium carbonate under a selectively controlled reaction environment. In its preferred embodiment precipitated calcium carbonate particles having a prismatic shape and an average equivalent spheroidal diameter of between about 1.5 and about 6.5 microns; large irregularly shaped particles having an average equivalent spherical diameter of between about 15 and about 25 microns; and multi-faceted spheroidal particles having an average equivalent spherical diameter of between 5 and about 15 microns, are provided. The reaction environment includes temperatures of between 0° C. and 60° C. and a surface active polyphosphate additive present in amounts of from about 0.1 and about 1.0 percent by weight.

2 Claims, 7 Drawing Sheets

PRECIPITATED CALCIUM CARBONATE PARTICLES FROM BASIC CALCIUM CARBONATE

This is a divisional of application Ser. No. 07/709,951, filed Jun. 4, 1991.

BACKGROUND OF THE INVENTION

This invention relates to novel precipitated calcium carbonate particles of varying size and shape, and to methods for their preparation involving the use of basic calcium carbonate as a precursor.

Calcium carbonate particles of varying sizes and shapes are useful as fillers or as reinforcing materials for rubber, paper, plastics, paints and other materials. These particles, may be roughly divided into two groups, to wit: natural calcium carbonate particles and precipitated calcium carbonate particles. Natural calcium carbonate is prepared by mechanically grinding limestone to particle sizes as small as 0.5 microns, although it becomes increasingly difficult to grind limestone below one micron. Moreover, ground limestone particles are usually very irregular in shape, and ordinarily exhibit a broad particle size distribution.

General methods for production of precipitated calcium carbonates are concerned with the slaking of lime (calcium oxide), temperature of carbonation, and rate of introduction of carbon dioxide into the slaked lime. By appropriately controlling the solution environment, either calcite, aragonite, or vaterite is produced. Depending on the conditions of the environment, calcite can have either a prismatic, scalenohedral or rhombohedral crystal habit. Aragonite is acicular and takes the form of either single or clustered needles. Vaterite is generally spherical but is unstable and converts readily to calcite. The crystal morphologies of the products are determined by the concentration of calcium and hydroxyl ion in the specific solution environment during the nucleation and growth of calcium carbonate.

Size control by varying slake and carbonation conditions is generally related closely to the resultant morphology and is usually limited to a relatively narrow range for each type of product.

Morphology and size are also significantly influenced by addition of various additives to slaked lime before carbonation. This is illustrated by U.S. Pat. No. 4,714,603 in which a synthesis for the preparation of spherical calcite particles is described wherein a dissolved polyphosphate is added to slaked lime prior to the introduction of carbon dioxide. Particle sizes of between 2.5 and 10.0 microns are disclosed with the size depending upon the quantity of polyphosphate added.

Other additives such as polybasic organic acids and polysaccharides have also been found to exert some size control when they are added to lime prior to carbonation, the effect being dependent on the source, age and purity of the lime used. However, the efforts heretofore employed to effect size control of precipitated calcium carbonate particles involve the introduction of additives or other controlling factors prior to, or in the initial stages of, the direct carbonation of lime.

Basic calcium carbonate was described by G. Schimmel in an article appearing in Naturwissenschaftem, 57, (38) 1970. It was determined that the formula for basic calcium carbonate was $2CaCO_3 \cdot Ca(OH)_2 \cdot 1.5H_2O$. The preparation of plate-shaped basic calcium carbonate has been described by H. Yamada in the Journal of Pulp and Paper Technology Society (Japan) 44, pages 62–69 (1990). The method disclosed therein described the addition of reagents such as saccharose and glutamic acid to lime prior to carbonation whereby crystals of platy basic calcium carbonate, as well as spherical vaterites, cubic or spindle shaped calcite and calcium carbonate hexahydrate were formed. A method of making basic calcium carbonate is also disclosed in an article by H. Yamada in Gypsum and Lime, 196 (1985). The synthesis appearing therein comprises preparing a slurry of calcium hydroxide by hydrating calcium oxide at a temperature of from 10° C. to 80° C., and thereafter cooling the slurry to a temperature of 15° C. to 20° C. Thereafter carbon dioxide is introduced at a rate and under prescribed reaction parameters to produce basic calcium carbonate.

SUMMARY OF THE INVENTION

It has now been found that utilizing basic calcium carbonate (hereinafter to be referred to as BCC) as a precursor, under carefully controlled carbonation conditions, will result in the preparation of novel precipitated calcium carbonate (hereinafter to be referred to as PCC) particles, of varying shapes and sizes which will have desirable applicability in a variety of paper or food applications on a size-dependent basis. More specifically it has been found that the controlled addition of gaseous carbon dioxide to an aqueous BCC slurry rather than to a calcium hydroxide slurry, in the presence of a surface-active polyphosphate at temperatures of between 0° C. and 60° C., will produce large PCC particles, the size and shape of which will depend on the amount of additive employed, and the temperature of the reaction, the amount of additive and temperature being in cooperative relationship. Other factors, such as for example, differences in the lime initially employed or the carbon dioxide introduction rate can also affect the size of the particles produced. These latter factors, however, are variable and can be adjusted empirically.

In accordance with this invention, it has been found possible to make: large prismatic particles having an average equivalent spherical diameter (AESD) of between about 1.5 and about 6.5 microns; large irregular shaped particles having an AESD of between about 15 and about 25 or more microns and large, rough-textured, multi-faceted spheroids having an AESD of between about 5 and about 15 microns. While the precise size or shape of the particles can vary according to the parameters of the reaction, as a general proposition the process of this invention will result in particles which would be larger than would be obtainable by previously known processes. Moreover, the process of this invention enables the preparation of "tailor-made" particles of shapes and sizes which can then be utilized for specifically selected applications.

This invention also contemplates paper products or food products including PCC particles produced by the process of this invention. In this regard, the PCC particles of this invention with an average equivalent spherical diameter (AESD) range of between about 1.8 and 2.5 microns are particularly useful as fillers for high strength paper. Particles between about 2 and 5 microns are particularly useful as coatings for dull finish paper. The large size particles of this invention are useful in food applications. Other applications for these particles can be found in ceramics, paints, plastic, rubber and other composite materials.

Figure 1:
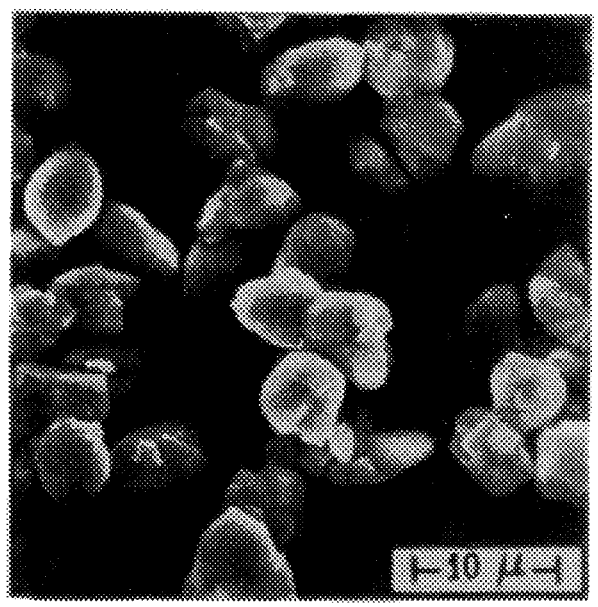
FIGS. 1–3 are photomicrographs, taken at a magnification of 2000×, of PCC particles formed according to the process of this invention utilizing as an additive 0.3, 0.2 and 0.1 percent by weight of sodium hexametaphosphate (SHMP), respectively.
Figure 2:
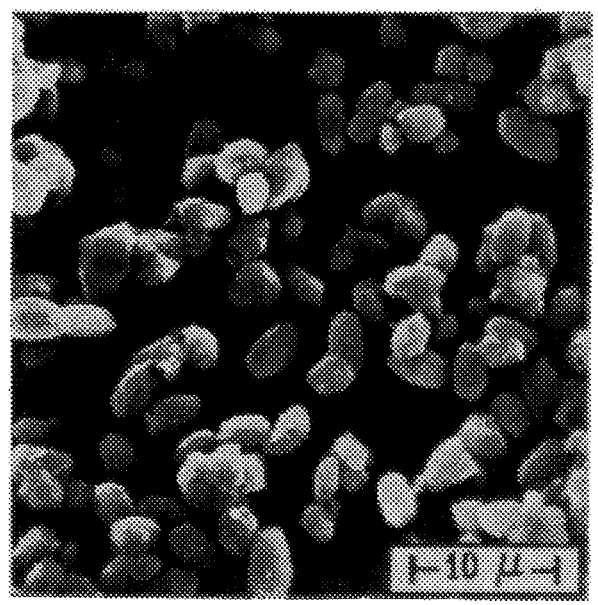

In each of the photomicrographs of FIGS. 1–13, a 10 micron reference marker is indicated.

DETAILED DESCRIPTION OF THE INVENTION

According to this invention, the particles of PCC of a size generally larger and of a morphology different than heretofore known, are provided by adding carbon dioxide to an aqueous slurry of BCC which has been preformed, or formed in situ, under a selectively controlled reaction environment.

More particularly, the process of this invention provides the aforesaid particles having an average equivalent spherical diameter (AESD) of from about 1.5 to about 25 microns, by adding carbon dioxide to an aqueous slurry of BCC at an effective temperature of between 0° C. and 60° C. in the presence of an effective amount of surface active polyphosphate, said effective amount being between about 0.1 and 1.0 percent by weight of the slurry, the size and morphology of the particles being varied by the temperatures and amounts of polyphosphate employed. Above about 1% the polyphosphate rapidly begins to lose its effect on increasing size and at about 1.5% begins to show a reversal of the effect.

There are other variables which can impact upon the size of the particles of the present invention. These variables are not narrowly critical and can be adjusted empirically. For example, the characteristics of lime may vary according to source. As will be explained hereinafter, this variance may sometimes impact upon the size of the particles; however, as a general proposition the particles, using the process of this invention, will be larger in size than would result from processes for the preparation of PCC heretofore known irrespective of the source of lime employed. In some instances, the amount of polyphosphate additive needed to produce certain desired sized particles of PCC may vary because of the lime employed, but will generally be within the ranges specified. In this regard, to form discrete PCC particles having a prismatic morphology and an AESD of between about 1.5 and about 6.5 microns, it has been found that the concentration of polyphosphate should range within about 0.1 and about 0.4 percent by weight. However, with limes from different sources the amount of polyphosphate needed to effect the desired discrete particle size can be in the upper or lower part of the range or slightly outside of the indicated ranges. Thus for one source of lime a 0.1 percent polyphosphate content could produce discrete particles having an AESD of about 1.5–2.0 microns, while another source of lime might require a 0.2 or 0.3 percent or more polyphosphate content in order to effect the same particle sizes.

Similarly, the temperature of the reaction environment may similarly have an effect on the amount of additive required. In general, temperatures in the lower ranges e.g. on the order of 0°–20° C. would produce smaller particle sizes than temperatures in the upper ranges, and would also necessitate higher concentrations of polyphosphate, i.e. in the 0.3–0.4 percent range, to effect the preparation of the desired larger particles. Conversely, higher reaction temperatures will result in larger AESD micron sizes with concomitant smaller concentrations of polyphosphate.

For the preparation of the discrete PCC particles having the aforesaid AESD of 1.5 to 6.5 microns and a generally prismatic shape, it is preferable to operate the reaction at a temperature of between 15° C. and 35° C. and to employ the polyphosphate additive at a concentration of between 0.2 and 0.4 percent by weight. It will be understood, as seen in the drawings, that some of the discrete particles can be flocculated, i.e. they will be weakly bonded together. It should also be noted that while the morphological designation "prismatic" is used to define these particles, at least some of these particles could be said to be rhombohedral in shape.

To form distinctive, large, irregular shaped particles of PCC having an AESD of between about 15 microns and about 25 or more microns, it has been found that the concentration of polyphosphate employed as an additive to the BCC slurry should range between about 0.5 and 1.0 percent by weight, and the temperature range of the reaction environment should be between about 20° C. to 60° C. Again, however, the temperatures can be empirically determined.

To form large, rather rough-textured, multi-faceted spheroids having an AESD of between about 5 and about 15 microns it has been found that the concentration of polyphosphate employed as an additive to the reaction environment should also range between about 0.5 and 1.0 percent by weight. However, to obtain these spheroids the temperature of the reaction environment should be between 0° C. and about 20° C. and preferably between about 10° C. and about 20° C.

It should be noted that the rough-textured, multi-faceted large spheroids and the large irregularly shaped particles and composed of intimately fused crystals rather than, for example, agglomerates of individual nodules.

As with the prismatic particles in the range of about 1.5 to about 6.5 microns, the size of the other large particles of this invention defined above can also be affected by the source of the lime employed in forming the BCC slurry.

There are other variables as well which can affect the size of the particles formed, the temperatures of the reaction and the concentrations of polyphosphate additive needed. These include the rate at which carbon dioxide is introduced into the reaction environment, and the concentration of BCC in the aqueous slurry which is to be carbonated to form the PCC particles or aggregates of the subject invention. While neither of these variables are narrowly critical and can be determined empirically, an introduction rate of carbon dioxide of between 0.2 and 1.0 liters/minute per 100 grams of BCC has been found to be suitable. The concentration of BCC in the slurry can usually vary between about 5 and about 18 weight percent of the slurry, depending on the lime employed.

The shapes and sizes of the particles of this invention can also be seen from the photomicrographs of FIGS. 1–13 which shall also be referred to in the examples.

As stated heretofore, BCC can be prepared by the aforesaid known processes, but preferably is formed by the partial carbonation of calcium hydroxide utilizing temperatures on the order of 0° to 20° C., with a range of between 10° and 15° C. being preferred. It is also preferred that the controlled addition of carbon dioxide to the slaked lime slurry be carried out at a flow level of about 0.1 to 0.4 liters per minute per 100 grams of calcium hydroxide until about 60 to 70 percent of the slaked lime has been carbonated.

The surface active polyphosphates employed in the instant process are surfactants commonly used as scale inhibitors, sequestrants, deflocculants and detergent promoters. Any water-soluble polyphosphate of the formula $M_{(n+2)}P_nO_{(3n+1)}$ or $(MPO_3)_n$ wherein M is hydrogen, ammonium or alkali metal and n is an integer of 2 or greater, can be used. Such polyphosphate in which an alkaline earth metal or zinc is the cation may also be used. Particularly suitable polyphosphates include the alkali metal polyphosphates and metaphosphates wherein n is from 2 to 25. Preferred are alkali metal pyrophosphate, tripolyphosphate and especially sodium hexametaphosphate.

While the process of this invention for making PCC is applicable to all concentrations of basic calcium carbonate slurries, from the aspect of practicality such concentrations are limited to at least about 5 percent by weight, lower concentrations being somewhat uneconomical. A concentration of 10 to 15 percent by weight is preferable because BCC is more easily produced at this level.

The carbonation of the BCC is continued until the product formation is complete and BCC is converted to the desired PCC end product. It is preferable that this conversion be completed at a pH of between 7 to about 8. Carbonation is usually completed in less than 1 hour and preferably between 15 and 30 minutes.

The nature of the carbon dioxide gas for the carbonation is not narrowly critical; the standard mixtures of carbon dioxide in either nitrogen or air commonly used for such carbonation being satisfactory. Likewise, the nature of the source for the starting lime to form BCC is not narrowly critical. Moreover either lime or hydrated calcium hydroxide may be used. However, as stated heretofore the source of the starting lime may affect the amounts of polyphosphate or the temperatures to be utilized. As also stated, however, these can be adjusted empirically.

The present invention will now be described in more detail by way of examples and by reference, where applicable, to the drawings. The examples are illustrative only and are not to be construed as limiting the invention.

EXAMPLE 1

A 4-liter jacketed, baffled, cylindrical stainless steel reactor, having an internal diameter of 13.5 cm, a height of 38 cm and a hemispherical bottom, equipped with a high-speed agitator having two, 5-cm diameter flat blade turbine impellers, positioned about 1.5 cm and 5.5 cm from the bottom and driven by a 1/15 hp variable speed motor, and a 0.3 cm, inside diameter, stainless steel tube curved under the center of the bottom blade for the introduction of a carbon dioxide/air stream, was used for preparation and reaction of BCC to form PCC.

A 16.5 weight percent aqueous calcium hydroxide slurry was prepared by adding 300 g of granular active lime obtained from Mississippi Lime Company quarried and calcined in St. Genevieve, Mo., hereinafter referred to as "lime A", having an available calcium oxide content of about 93 or more weight percent as determined by ASTM procedure C-25-72, to 2100 g of water in the above-described reactor at about 50° C. and stirred at 1000 rpm for 10 minutes. The slurry was diluted to about 12 weight percent, screened through 60 mesh to remove grit, and cooled in the reactor to 10°–15° C. The agitator was adjusted to 1900 rpm and the slurry was carbonated to basic calcium carbonate (BCC) by introducing a gas mixture of 12 volume percent carbon dioxide in air at 1.67 standard liters per minute (SLM) into the slurry while holding the reaction temperature below 20° C. by running iced cooling fluid through the jacket. The carbonation is continued until about 67% of the lime is carbonated, which signified the formation of BCC. The BCC formed by the process is then either used immediately to produce precipitated calcium carbonate or filtered and dried for later use.

EXAMPLE 2

A sample of 3000 ml of slurry containing 535 g of BCC in water having a pH of 12 made from lime A, and following the procedure of Example 1, was placed into the equipment described in Example 1. The temperature was adjusted to 25° C. A freshly made solution containing 1.2 g (0.3 weight %) of sodium hexametaphosphate (SHMP) (Hooker Chemical, Technical grade) in 50 g of water was added to the BCC slurry and stirred for 5 minutes at 1900 RPM. Stirring was continued during carbonation at 1.67 SLM using 12 volume percent $CO_2$ in air for about 40 minutes until the pH decreased from about 12 to 8 and remained stable, the latter indicating completion of carbonation. The temperature was allowed to rise to 35° C. during carbonation. A sample of the slurry was extracted for particle size analysis. The remaining slurry was passed through U.S. Standard No. 325 (44 microns) sieve to remove grit and then vacuum filtered on a Buchner funnel. The filter cake was dried at 120° C. for 16 hours to give a precipitated calcite product having a specific surface area (SSA) of 1.8 $m^2/g$ and an average equivalent spherical diameter (AESD) of 6.1 microns with 87 weight percent of the particles within ±50% of the AESD, i.e. from 9.0 to 3.0 microns.

A photomicrograph of the product at 2000× is shown in FIG. 1. The surface area of the product was obtained using a Micromeritics Flowcarb II 2300, which employs BET theory with nitrogen as the absorbing gas. The particle size was determined by a sedimentation technique using a Micromeritics Sedigraph Model 5100 on an aqueous dispersion of the product at about 3% and using about 0.1% carboxylated polyelectrolyte (Daxad 30) as a dispersant.

EXAMPLE 3

Discrete precipitated calcium carbonate particles of varying sizes were prepared using the process described in Example 2 except decreasing levels of sodium hexametaphosphate were used to give products with decreasing particle sizes as indicated in the following table I as shown in 2 and 3. In the table below, run 1 corresponds to FIG. 1, run 2 to FIG. 2, run 3 to FIG. 3. Run 4 is a control indicating the particle size in which no sodium hexametaphosphate is added. It is represented in FIG. 4.

TABLE 1

| RUN | $(NaPO_3)_6$ % | AESD MICRONS | WT % OF ±50% OF AESD | SSA $M^2/g$ | MORPHOLOGY |
|---|---|---|---|---|---|
| 1 | 0.3 | 6.1 | 87 | 1.8 | Prismatic |
| 2 | 0.2 | 3.5 | 85 | 2.1 | Prismatic |
| 3 | 0.1 | 2.0 | 75 | 4.8 | Prismatic |
| 4 | 0 | 1.37 | 71 | 4.7 | Prismatic |

Figure 3:
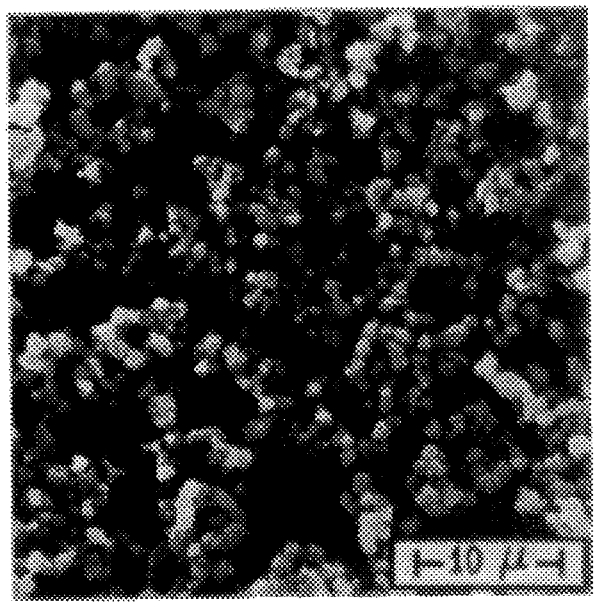
Figure 4:
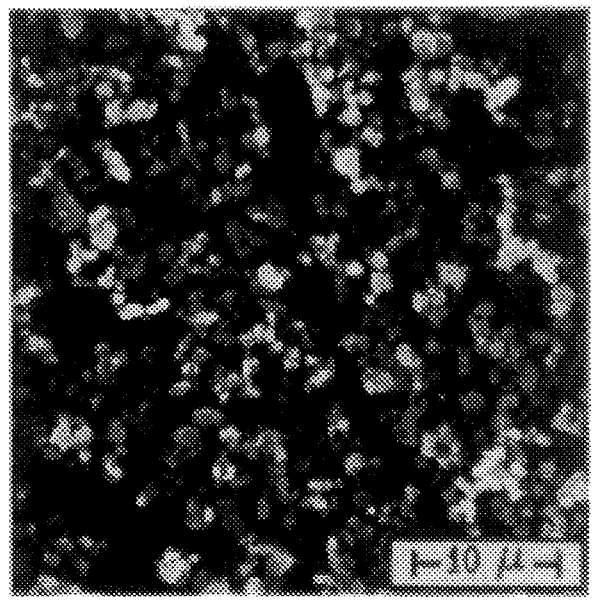
FIG. 4 is a photomicrograph, at the same magnification as FIG. 1 to which no phosphate has been added.

The particle size in FIG. 4 may not appear to be appreciably different than in FIG. 3. This is because with the type of source lime used, 0.1% SHMP is at the threshold of the effect on size control; the differential at the magnification employed may not be readily apparent to visual inspection.

EXAMPLE 4

Figure 5:
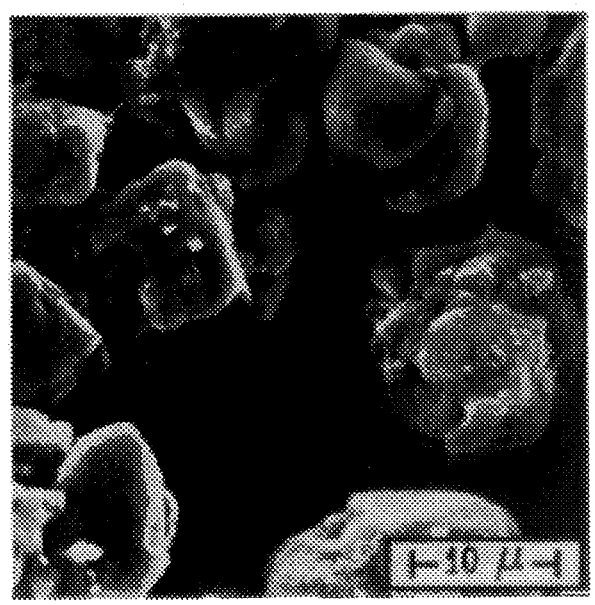
FIGS. 5–6 are photomicrographs, also taken at a magnification of 2000×, of large size irregular shaped particles of PCC formed according to the process of this invention utilizing as an additive 0.5 and 1.0 percent by weight of SHMP, respectively.
Figure 6:
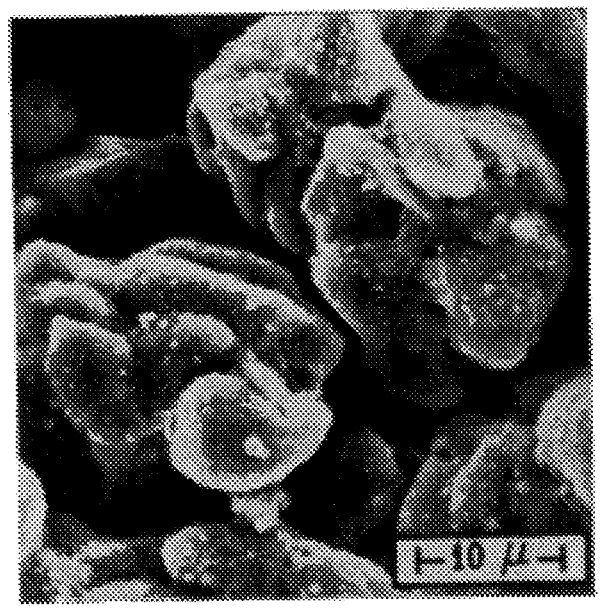
Figure 7:
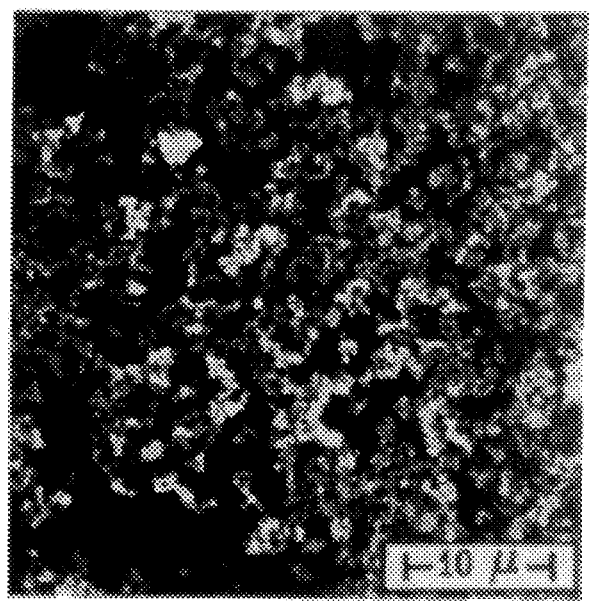
FIGS. 7–9 are photomicrographs, also taken at a magnification of 2000×, of PCC particles utilizing a different lime source than used in FIGS. 1–3 but the same additive at the same level of concentrations respectively corresponding to FIGS. 1–3.
Figure 8:
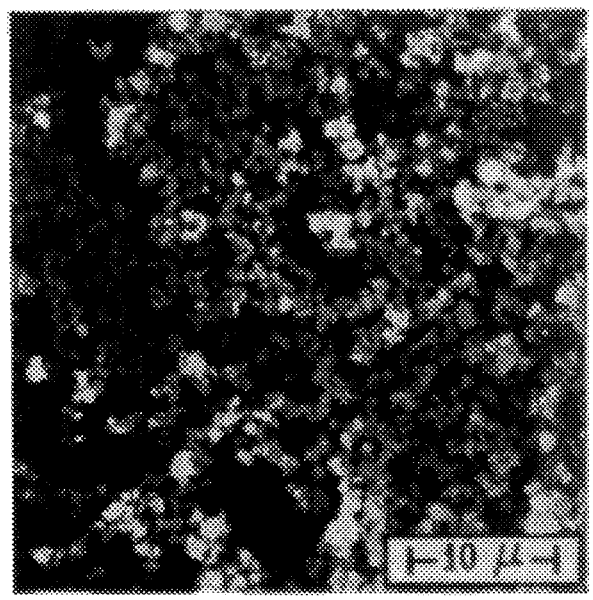
Figure 9:
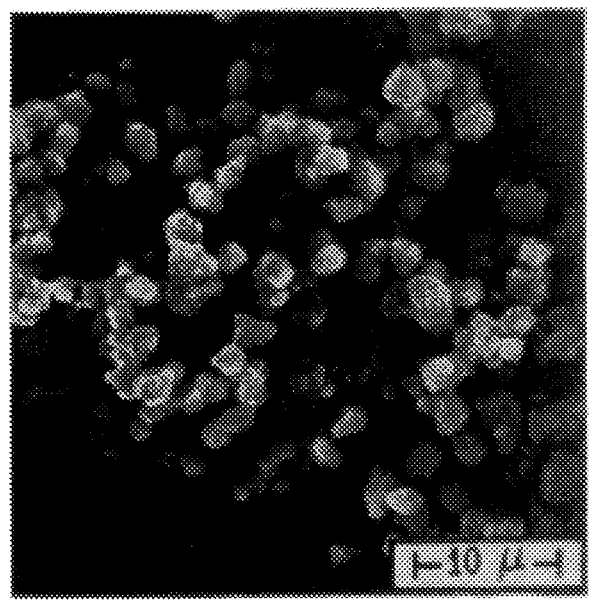
Figure 10:
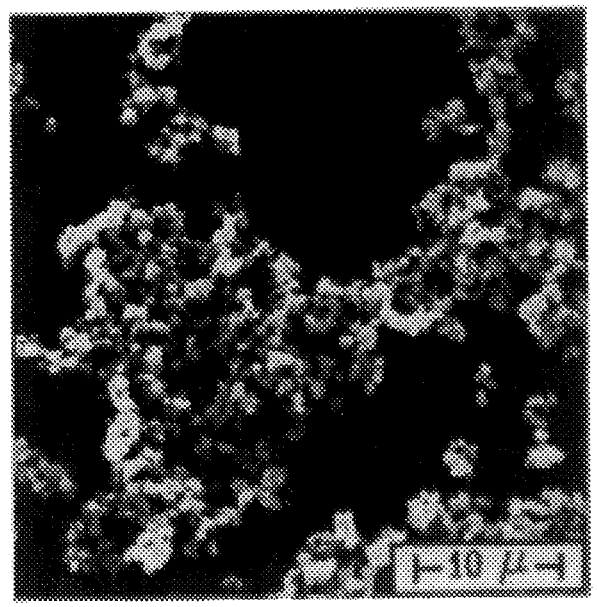
FIGS. 10–13 are photomicrographs taken at a magnification of 2000× of PCC particles formed according to the process of this invention utilizing as an additive 0.25, 0.4, 1.0 and 1.0 percent by weight of SHMP, respectively, but at ranging temperatures of 15°–20° C., 15°–20° C., 35° C. and 15°–20° C., respectively.
Figure 11:
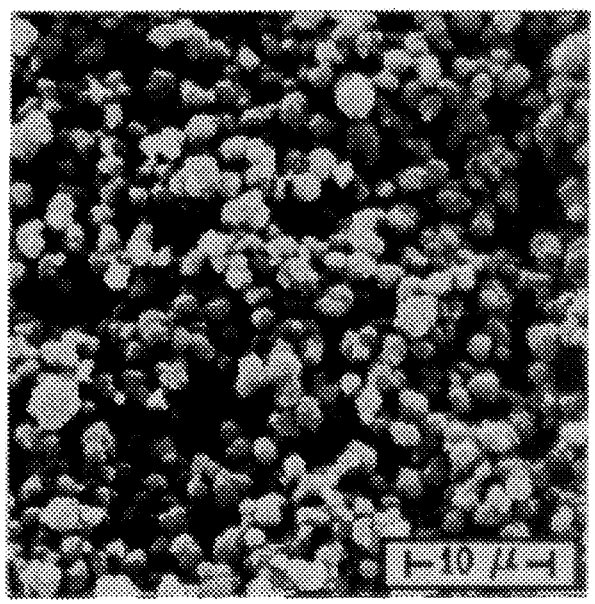
Figure 12:
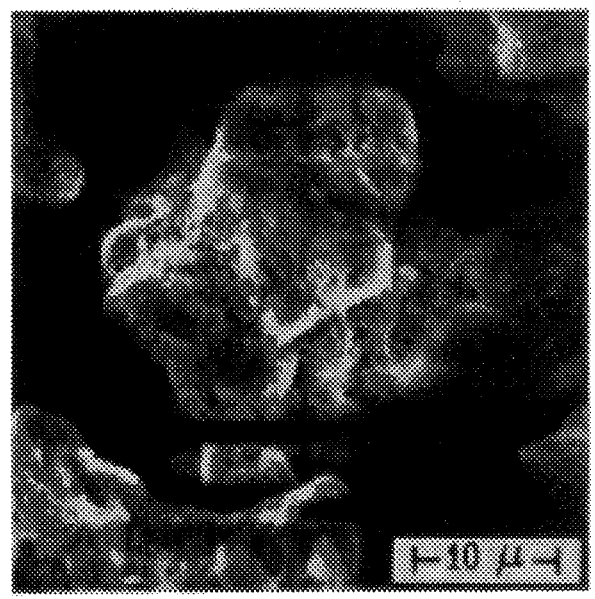
Figure 13:
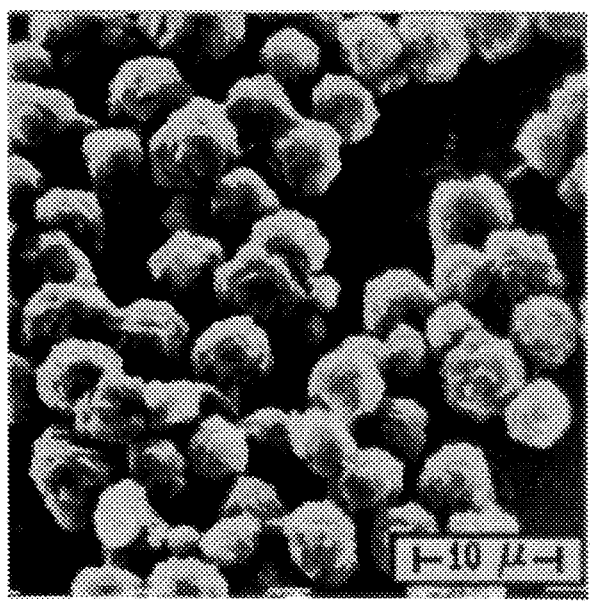

Precipitated calcium carbonate particles of a very large size were prepared using the process described in Example 2 except increasing levels of sodium hexametaphosphate were used to give products with increasing particle sizes and a change in morphology to fused irregular particles as shown in the following table and in FIGS. 5 and 6. In table II, run 1 is the same as run 1 of Table I, run 5 corresponds to FIG. 5 and run 6 correspond to FIG. 6.

TABLE II

| RUN | $(NaPO_3)_6$ % | AESD MICRONS | WT % of +50% OF AESD | SSA $M^2/g$ | MORPHOLOGY |
|---|---|---|---|---|---|
| 1 | 0.3 | 6.1 | 87 | 1.8 | Prismatic |
| 5 | 0.5 | 17.0 | 90 | 1.7 | Fused irregular particles |
| 6 | 1.0 | 20.0 | 75 | 4.3 | Fused irregular particles |

EXAMPLE 5

Precipitated calcium carbonate of varying sizes was prepared using the process as described in Examples 2 and 3 except that a different lime source was used to prepare the BCC used in the synthesis of the products indicated in the following table. This lime source, hereinafter referred to as "lime B", was obtained from Pfizer Inc and was quarried and calcined in Adams, Mass. The concentration of the BCC was 486 grams in 3000 grams of water and was carbonated using 1.5 SLM of 28 volume percent $CO_2$ in air for about 30 minutes. The results indicated in Table III below indicate similar effects in size increase with increasing SHMP levels but to a different degree depending on the lime source. Runs 7, 8 and 9 in Table III correspond to FIGS. 7, 8 and 9. Runs 4, 2 and 1 are repeated for contrast. It is to be noted that to obtain the desired sized particles the amount of SHMP necessary was higher for lime B than lime A, i.e. it was necessary to use 0.35 percent SHMP in run 9 to obtain an AESD of 2.8 microns. In run 8 the desired size was not obtained with an 0.2 weight percent amount of SHMP.

TABLE III

| RUN | LIME SOURCE | $(NaPO_3)_6$ % | AESD MICRONS | Wt % OF ±50% OF AESD | SSA $M^2/g$ | MORPHOLOGY |
|---|---|---|---|---|---|---|
| 4 | A | 0 | 1.37 | 71 | 4.7 | Prismatic |
| 7 | B | 0 | 0.7 | 77 | 7.0 | Prismatic |
| 2 | A | 0.2 | 3.5 | 85 | 2.1 | Prismatic |
| 8 | B | 0.2 | 1.11 | 64 | 6.0 | Prismatic |
| 1 | A | 0.3 | 6.1 | 87 | 1.8 | Prismatic |
| 9 | B | 0.35 | 2.8 | 80 | 2.8 | Prismatic |

EXAMPLE 6

Precipitated calcium carbonate was prepared using the process as described in Example 5, but the temperature was held at 20° C. rather than from 25° to 35° C. during carbonation. The results in the following table indicate that lower reaction temperatures give smaller particle sizes and that even at a higher level of SHMP the particles were significantly smaller and more spheroidal in shape. In Table IV, runs 10 and 12 were conducted at 15°–20° C. while runs 8, 9 and 12 were conducted at 25°–35° C. Runs 10 through 13 correspond to FIGS. 10–13.

TABLE IV

| RUN | REACT. TEMP. °C. | $(NaPO_3)_6$ % | AESD MICRONS | Wt % OF ±50% OF AESD | SSA $M^2/g$ | MORPHOLOGY |
|---|---|---|---|---|---|---|
| 8 | 25–35 | 0.2 | 1.11 | 64 | 6.0 | Prismatic |
| 10 | 15–20 | 0.25 | 1.1 | 70 | 4.9 | Prismatic |
| 9 | 25–35 | 0.35 | 2.8 | 80 | 2.8 | Prismatic |
| 11 | 15–20 | 0.4 | 2.11 | 79 | 2.7 | Prismatic |

TABLE IV-continued

| RUN | REACT. TEMP. °C. | (NaPO₃)₆ % | AESD MICRONS | Wt % OF ±50% OF AESD | SSA M²/g | MORPHOLOGY |
|---|---|---|---|---|---|---|
| 12 | 35 | 1.0 | 20 | 90 | 2.6 | Irregular |
| 13 | 15–20 | 1.0 | 7.4 | 65 | 4.2 | Spheroidal |

EXAMPLE 7

A handsheet study was completed to compare standard calcium carbonate fillers (ground limestone, scalenohedral PCC) with a PCC of the present invention (prepared according to the procedure of Example 3). Properties of the calcium carbonate fillers evaluated in this handsheet study are summarized in Table V below. Paper samples were prepared using a Formax (Noble and Wood-type) handsheet former. The fillers were added to a pulp blend consisting of 75% bleached hardwood kraft and 25% bleached softwood kraft beaten to a Canadian Standard Freeness of 400 and a pH of 7 to 8. Hercon-85, an alkyl ketene dimer sizing agent, was added at a rate of 5 lb/ton, followed by Percol 175, a cationic polyacrylamide retention aid which was added at a rate of 1 lb/ton. After forming, the sheets were removed from the Formax screen and pressed once at 20 psi. The sheets were then dried using a drum dryer set at 115° C. The handsheets were conditioned and tested at 50% relative humidity and 23° C. The resulting handsheet properties are summarized in Table VI. It was observed that the PCC of the present invention provides equal or superior strength (tensile and Scott bond) and sizing compared to standard calcium carbonate fillers. It provides a means for improving the strength of paper even at higher filler levels.

TABLE V

| CaCO₃ SAMPLE | MOR-PHOL-OGY | AESD MICRONS | WT % OF ±50% OF AESD | SSA M²/g |
|---|---|---|---|---|
| PCC-S | Scaleno-hedral | 1.35 | 70 | 11.6 |
| Ground Limestone | Irregular | 1.14 | 40 | 10.2 |
| PCC-Present Invention | Prismatic | 1.86 | 55 | 3.7 |

TABLE VI

| | PCC-S | GROUND LIMESTONE | PCC-PRESENT INVENTION |
|---|---|---|---|
| | | 15% FILLER | |
| Basis weight (O.D.g/m²) | 61.8 | 61.5 | 61.9 |
| % CaCO₃ (actual) | 15.4 | 15.8 | 14.8 |
| Tensile Breaking Length (km) | 2.2 | 2.3 | 2.6 |
| Scott Bond (ft. lb. × 1000) | 40.6 | 37.6 | 39.9 |
| Hercules Size Test (sec) | 35.4 | 111.2 | 272.1 |
| | | 25% FILLER | |
| Basis weight (O.D.g/m²) | 61.7 | 58.9 | 59.7 |
| % CaCO₃ (actual) | 26.8 | 24.9 | 24.1 |
| Tensile Breaking Length (km) | 1.3 | 1.9 | 2.1 |
| Scott Bond (ft. lb. × 1000) | 16.1 | 20.3 | 27.4 |
| Hercules Size Test (sec) | 1.2 | 1.6 | 165.3 |

EXAMPLE 8

The unique properties of the large prismatic calcite of the present invention as a dull finish paper coating pigment were shown by substituting it for a low gloss spherical calcite used for dull coatings on an equal weight basis in a standard low gloss paper coating formulation. The physical properties of the pigments are compared in Table VII. A typical paper coating formulation is indicated in table VIII.

TABLE VII

| CaCO₃ Pigment | MORPHOLOGY | AESD MICRONS | WT % OF ±50% OF AESD | SSA M²/g |
|---|---|---|---|---|
| Spherical Calcite[1] | Spherical | 3.4 | 74 | 4.5 |
| PCC-Present Invention | Hexagonal Prisms | 3.4 | 92 | 1.9 |

[1]Albasphere ® PCC, Pfizer Inc., New York, NY

TABLE VIII

| ORDER OF ADDITION | COMPONENT | PARTS |
|---|---|---|
| 1 | Coating Clay[1] | 50 |
| 2 | CaCO₃ Pigment | 50 |
| 3 | SBR Latex[2] | 6 |
| 4 | Hydroxyethylated Starch[3] | 8 |
| 5 | Calcium Stearate Lubricant[4] | 1 |
| 6 | Insolubilizer[5] | 0.4 |

[1]No. 1 High brightness coating clay, Astra-Brite, ECC America Inc., Atlanta, GA
[2]Styrene/butadiene rubber latex: Dow 620, Dow Chemical Co., Midland MI
[3]Penford 280, Penford Products Co., Cedar Rapids, IA
[4]Calcium stearate, Nopcote C-104, Henkel Corp. Paper Chemicals, Charlotte, NC
[5]Parez 707, American Cyanamid Co., Wayne, NJ With each pigment identified in Table VII above, the coating colors were prepared by first slurrying the coating clay at 73 percent solids using 0.1 percent sodium polyacrylate dispersant, based on clay, using a Cowels-type mixer with a two-inch blade at 5000 RPM for 15 minutes. The calcium carbonate pigment was similarly slurried at the highest possible solids using a sodium polyacrylate dispersant as required by the pigment's dispersant demand. At this point, 50 parts of the calcium carbonate pigment slurry were added to 50 parts of the clay slurry (dry weight basis) with the mixer at approximately 1200 rpm. The latex, starch, lubricant and insolubilizer were then added, and the pH of the coating color was adjusted to between 8.5 and 9.0 with ammonium hydroxide. After mixing for approximately 5 minutes at 1200 RPM, the percent solids and viscosities of each coating color were evaluated as indicated in Table IX below. The pigment of the present invention produced better low shear and high shear viscosity than the spherical Calcite identified in Table VII.

TABLE IX

CaCO₃ Pigment Used in Coating Color

| Test | Spherical Calcite | PCC-Present Invention |
|---|---|---|
| % Solids | 62.8 | 62.7 |
| Low Shear Viscosity, Centipoise[1] | 5860/2364 | 4520/1844 |
| High Shear Viscosity, Centipoise[2] | 63.9 | 53.5 |

[1]Brookfield viscometer, Model RTV, 20 RPM/100 ROM, Brookfield Engineering Labs, Inc., Stoughton, MA
[2]Hercules high shear viscometer, Model ET 24-6, E-bob, 400,000 dyne-cm/cm spring set. Kaltec Scientific Inc., Novi, MI The coatings were applied to a 82.9 gram per square meter freesheet basestock with a Dow Laboratory Paper Coater (Modern Metalcraft, Inc., Midland, Mich.) and the coated sheets were dried on a rotating drum at 100° C. All coated sheets were then conditioned for 24 hours at 23° C. and 50 percent relative humidity. After conditioning, coated sheets chosen on the basis of nearly equivalent coat weight were supercalendered 3 nips on a laboratory supercalender operated at 1600 pounds per linear inch with the rolls heated to 66° C. The coated sheets were then subjected to a series of tests listed in Table X below along with the results.

TABLE X

| COATED PAPER TEST | SPHERICAL CALCITE | PCC-Present Invention |
|---|---|---|
| Coat Weight (g/m²) | 12.1 | 12.1 |
| TAPPI Brightness[1] | 84.7 | 84.4 |
| TAPPI Opacity[1] | 88.3 | 88.2 |
| Sheet Gloss (75°)%[1] | 26.2 | 20.4 |
| Print Gloss (75°)%[1] | 62.6 | 60.7 |
| Ink Snap[2] | 36.4 | 40.3 |
| Croda Red[3] | 52.3 | 56.8 |
| Gurley Porosity, sec/10 cc[1] | 69 | 108 |
| Roughness, micrometers[4] | 2.13 | 2.23 |
| Picking Strength, cm/sec[1] | 118 | 159 |

[1]TAPPI Official Test Methods
[2]Print Gloss - Sheet Gloss
[3]% of original brightness, 2 minutes
[4]Parker Print-Surf The excellent dulling properties of the large prismatic calcite of the present invention are evident. The pigment not only outperformed the spherical calcite, but did so while producing superior ink snap, a more ink receptive surface and better picking strength.

While the preferred embodiments of the subject invention have been described and shown, it is understood that alternatives, variables and modifications, such as those suggested and others, may be made thereto and fall within the scope of the invention.

I claim:

1. High strength paper having as a filler precipitated calcium carbonate particles having a generally prismatic shape and an average equivalent spherical diameter of between about 1.8 and about 2.5 microns.

2. Dull finish paper coated with a formulation containing precipitated calcium carbonate particles having a generally prismatic shape and an average equivalent spherical diameter of between about 2 and about 5 microns.

* * * * *